Nov. 5, 1968  JIRO MATSUMOTO ET AL  3,409,726
DEVICE FOR STIRRING MOLTEN METAL IN AN ELECTRIC FURNACE
Filed July 9, 1965  4 Sheets-Sheet 1

INVENTORS
JIRO MATSUMOTO
ARIMICHI ABE

BY *[signature]*

ATTORNEY

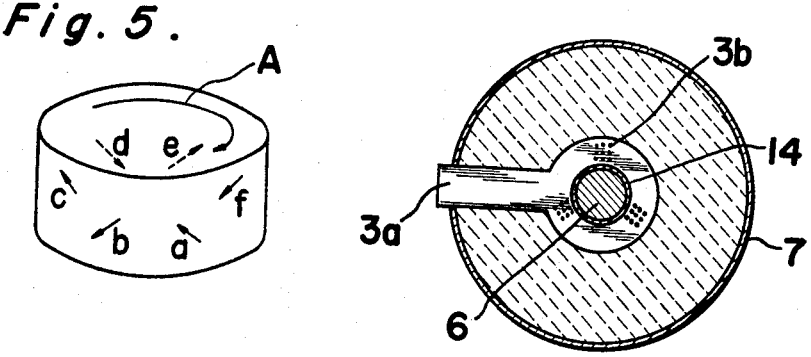
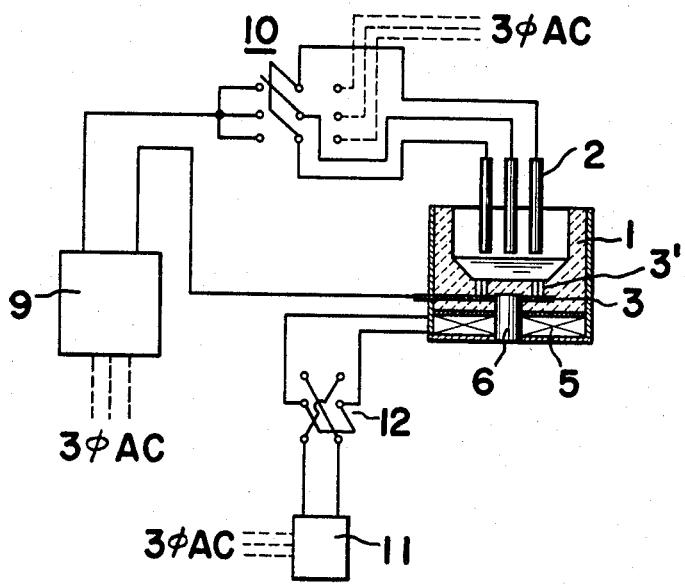

Nov. 5, 1968    JIRO MATSUMOTO ET AL    3,409,726
DEVICE FOR STIRRING MOLTEN METAL IN AN ELECTRIC FURNACE
Filed July 9, 1965    4 Sheets-Sheet 4

INVENTORS
JIRO MATSUMOTO
ARIMICHI ABE

BY
ATTORNEY

United States Patent Office 3,409,726
Patented Nov. 5, 1968

3,409,726
DEVICE FOR STIRRING MOLTEN METAL IN
AN ELECTRIC FURNACE
Jiro Matsumoto, Odawara, Sendai, and Arimicihi Abe,
Naga-machi, Sendai, Japan, assignors to Tohoku
Special Steel Works Limited, Naga-machi, Sendai,
Japan
Filed July 9, 1965, Ser. No. 470,683
Claims priority, application Japan, Mar. 23, 1965,
40/16,480
5 Claims. (Cl. 13—11)

ABSTRACT OF THE DISCLOSURE

This device for stirring molten metal in an electric furnace has at least one electrode in the furnace to be at the upper surface of the molten metal, and at least one other electrode at the bottom of the furnace for feeding direct currents through the molten metal between the electrodes by connecting the electrodes respectively to D.C. electric power of opposite polarity. A D.C. electromagnet and magnetic material, or two or more D.C. electromagnets of opposite polarity, are mounted respectively at the central portion of the bottom of the furnace and at the side wall of the furnace for producing radial magnetic lines of force through the molten metal between them when the electromagnet, or electromagnets, are excited.

---

This invention relates to a method of stirring molten metal in an electric furnace and a device therefor, more particularly to a novel method of stirring molten metal in the furnace and an improved device to provide excellent stirring effects by using D.C. electric field without necessitating powerful electromagnets as in conventional method of stirring.

Electric arc furnaces having stirrers have heretofore been widely used owing to the following advantages:
 (1) Speeding-up the chemical reaction;
 (2) Improvement in the homogeneity of the bath temperature;
 (3) Improving the homogeneity of the bath; and
 (4) Simplification of deslagging.

Especially in the case of electric arc furnaces of a large size and furnaces for melting high grade alloy steels, such a stirrer plays extremely important roles. Due to such reasons a number of methods for stirring molten metals in electric furnaces have been proposed, however, only two types of stirrers, i.e. the inductive stirrer using a rotary magnetic field and the inductive stirrer using a rotary D.C. electromagnet, are actually used at present. In conventional electric arc furnaces having such stirrers, the metal charged in the furnace is melted by means of A.C. currents, but such A.C. currents are not used for the purpose of stirring molten metals, and in fact, the conventional method of stirring molten metals has been to utilize the forces acting between a changing magnetic field produced by an electromagnet mounted at the bottom of the furnace and "eddy currents" in the bath induced by said changing magnetic field. Accordingly, the strength of the stirring force according to conventional methods has been almost exclusively dependent on the intensity of the changing magnetic field produced by said electromagnet, and hence it is apparent that a very powerful electromagnet is necessary to stir up the molten metal effectively.

The principal object of the invention is to provide a novel method of stirring molten metal and an improved stirrer for obtaining more effective stirring forces than those of conventional ones without using such powerful electromagnets as those necessitated in conventional devices.

The stirring method of the invention is entirely different from said conventional methods and it is based on the mutual effect of D.C. currents passing through the molten metal and D.C. magnetic field caused by D.C. electromagnets.

According to the invention, a D.C. electromagnet or a solenoid is provided at such a portion of the furnace that the magnetic lines of forces produced by said electromagnet or solenoid intersect with the currents passing through the molten metal to induce strong mechanical forces, and thereby the molten metal in the furnace is stirred up by means of said mechanical forces produced by mutual actions between said D.C. currents and said magnetic field caused by the D.C. electromagnet or solenoid. According to the method of the invention, the magnitude of the induced mechanical forces is proportional to the product of the amperage of the current passing through the motlen metal and the intensity of said magnetic field, and accordingly, substantially lower level of said magnetic field intensity is sufficient for stirring the molten metal compared with that in conventional methods, and thus considerable saving is possible in the cost of electromagnets and in the electric power consumption therein.

The installation cost of the stirring device of the invention is a little more expensive, such as about 12%, than one of the cheapest inductive stirrers using rotary D.C. electromagnets among conventional stirrers. On the other hand, in comparing costs of the electromagnets of said two devices, more than 60% of the installation cost of the device of the invention is used for the installation of a D.C. power source, and the cost of electromagnet of the invention itself is about ½ of that of the conventional stirrer. Accordingly, if each of two furnaces is provided with each stirrer of the invention by using one D.C. power source installation in common, then the installation cost for such two stirrers of the invention will become lower than the cost of similar installation of two conventional stirrers using rotary D.C. electromagnets by about 13%. According to the invention, the direction of the movement of the motlen metal can be easily reversed by reversing the polarity of D.C. current passing through the molten metal or exciting current for the electromagnet, thereby the stirring effects can be improved substantially.

In short, the device of the invention can produce an excellent stirring force with less electric power and lower installation cost compared with those of conventional stirrers of similar kind, and in addition, provides means for adjusting the strength and direction of said stirring force with ease.

For a better understanding of the invention reference is taken to the accompanying drawings, in which
 FIGS. 1 to 5 illustrate the operative principles of the device of the invention, wherein
 FIG. 1 is a sectional elevation of an electric arc furnace having an electromagnet at the bottom portion thereof;
 FIG. 2 is a transverse sectional view of FIG. 1;
 FIG. 3 is a sectional elevation similar to FIG. 1, showing another type of electric arc furnace having electromagnets at circumferential portions thereof;
 FIG. 4 is a transverse sectional view of FIG. 3;
 FIG. 5 is a perspective view illustrating the manner of the movement of molten metal in an electric arc furnace having an electromagnet at the bottom portion thereof as shown in FIGS. 1 and 2;

FIG. 6 is an electric circuit diagram for an electric arc furnace having an electromagnet at the bottom portion thereof according to the invention;

FIG. 8 is a transverse sectional view of FIG. 7; and

Figure 1:
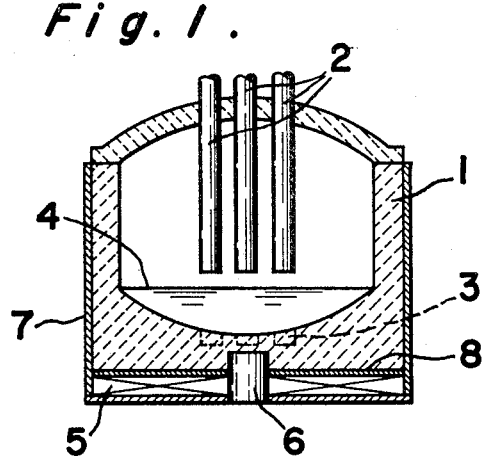
Figure 2:
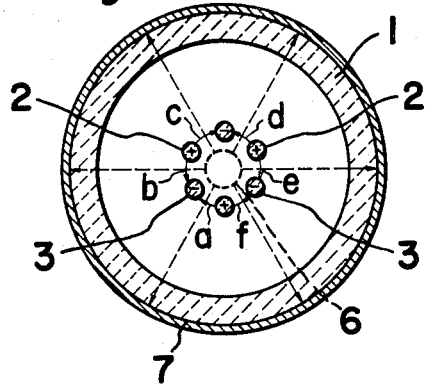

Referring to FIGS. 1 and 2 showing an electric arc furnace having an electromagnet at bottom thereof, reference numeral 1 represents the furnace wall, 2 anodes, 3 cathodes, 4 molten metal, 5 exciting coils for the electromagnet, 6 a magnetic pole, 7 an outer casing of the furnace made of magnetic material which also acts as a magnetic pole cooperating with said magnetic pole 6, and 8 the bottom plate of the furnace made of a nonmagnetic metal. The layout of the anodes, cathodes and magnetic poles is shown in FIG. 2. The relative positions of anodes, cathodes and magnetic poles exerts critical influences on the movement of the molten metal in the furnace, and the furnace shown in FIGS. 1 and 2 is provided with three anodes and three cathodes embedded in the inside bottom of the furnace and located alternately at corners of a hexagon in conjunction with a magnetic pole located at the center of said hexagon. The positioning of said poles is not limited to such an arrangement only, and for example they can be laid out in such manners as three cathodes located directly below three anodes or a plurality of cathodes embedded in the furnace bottom in the proximity of a circle passing through vertical projections of said three anodes. It is not necessary to limit three anodes, but two anodes or more than three anodes may be also employed for successful stirring operation. In any case, it is necessary to locate cathodes on the bottom of the furnace in the proximity of a circle passing through the vertical projections of anodes thereon in order to carry out stirring operation of the molten metal efficiently. It is also possible to obtain sufficient stirring effects by using only one anode located at the center of the furnace to cooperate with a plurality of cathodes embedded in the inside bottom of the furnace on a circle having its center at the vertical projection of said single anode. If the polarities of electrodes positioned as just described are reversed, the direction of the stirring force obtained thereby will be reversed but the magnitude thereof will, of course, remain the same as long as the magnetic field remains unchanged.

Stirring operation of the molten metal can be started by feeding D.C. current through exciting coils of the electromagnets while passing D.C. current through molten metal in the furnace. The stirring effects are not affected by dipping the anodes into the slag or molten metal or raised above it with some gap. Use of solenoids having no iron cores instead of said electromagnet placed at the bottom of the furnace will bring about substantially the same stirring effects.

When three anodes 2 and one magnetic pole 6 are arranged as shown in FIG. 2, an electric current fed to an anode flows toward two adjacent cathodes as shown by solid line arrows. The electromagnet placed at the central portion of the bottom of the furnace produces magnetic lines of force radiating from said magnetic pole 6 radially toward the outer casing 7 surrounding the furnace wall through molten metal 4 resulting in a radial magnetic field as shown by broken lines in FIG. 2. Thereby, said electric currents and said magnetic lines of force intersect with each other, for instance, at points a, b, c, d, e and f as shown in FIG. 2, and mechanical forces are induced in the molten metal by the reaction between said electric currents and the magnetic lines of force in accordance with the Fleming's left-hand rule. In the arrangement shown in FIG. 2, the molten metal located at the point a is urged upwards by one of thus induced mechanical forces with an angle to a vertical direction depending on the inclination of the said electric current and the magnetic lines of force at the point a, and the molten metal at the point b is urged downwards by another one of thus induced forces with a similar angle to the vertical direction. At points c, d, e, and f, similar induced forces act on the molten metal causing movement thereof as shown in FIG. 5, i.e. upward movements at three points corresponding to points a, c, and e and downward movements at the other three portions corresponding to points b, d, and f. Consequently, the entire molten metal in the furnace is forced to circulate along concentric circles in the clockwise direction as shown by the arrow A in FIG. 5. By reversing the direction of either one of melting current or exciting current of the electromagnet, the direction of said circulation of the molten metal is reversed causing considerable vortices at three positions in the bath, thereby the stirring action is substantially activated. Instead of a single electromagnet or solenoid placed at bottom of the furnace, a plurality of electromagnets or solenoids may be placed to produce similar configurations of the magnetic field to that produced by said single electromagnet, can be utilized for obtaining substantially same stirring effects of the molten metal in the furnace.

Figure 3:
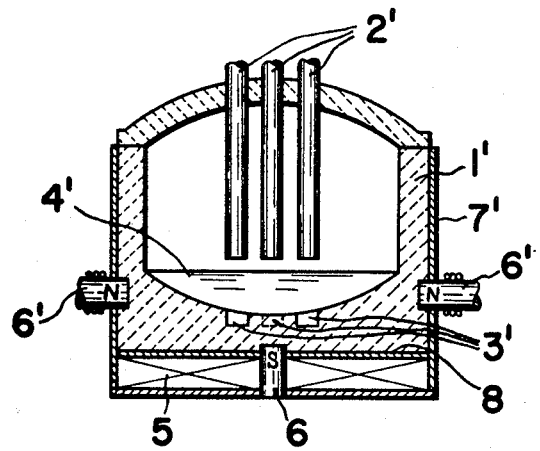
Figure 4:
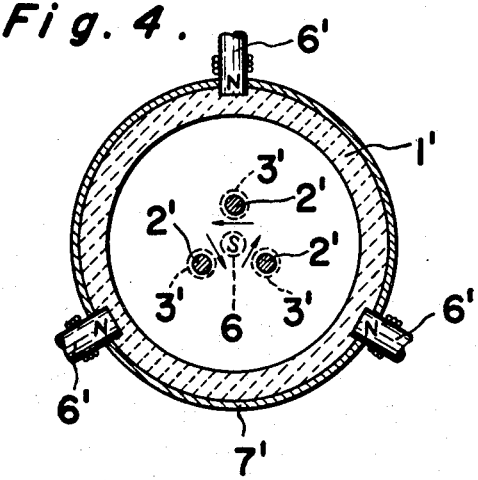

FIGS. 3 and 4 illustrate another embodiment of the invention having three electromagnets 6' of a common polarity secured to the outer casing 7' of the furnace wall 1' and another D.C. electromagnet 6 of an opposite polarity to that of said electromagnets 6' mounted at the center part of the bottom of the furnace, wherein each of three cathodes 3' embedded in the inside bottom portion of the furnace at a point directly underneath each of three anodes 2'. Each electromagnet 6' is secured to the outer casing 7' at a point on each radial plane radiating from the vertical center line of the furnace and including an anode 2' respectively and in a horizontal plane through about the middle of the depth of the molten metal in the furnace. In this case, the outer casing 7' of the furnace wall should be made of nonmagnetic material. In the embodiment shown in FIGS. 3 and 4, the number of anodes, cathodes or D.C. electromagnets secured to the outer casing 7' is not necessarily limited to only three, and for instance one, two or more than three anodes, cathodes and D.C. electromagnets respectively may be used as long as a similar correlations between the D.C. electric currents flowing through the molten metal and the magnetic lines of force caused by the D.C. electromagnets to that of said embodiment are attained.

When the D.C. electromagnets 6 and 6' are energized, the cores therein will be magnetized and polarized, for example, as shown in FIGS. 3 and 4 to produce magnetic lines of force in three groups radiating from each magnet pole 6' and concentrating to the center of the inside bottom of the furnace passing through three spaces between each pair of cooperating anode 2' and cathode 3' respectively. Since the density of the D.C. currents flowing through the molten metal located in said three spaces between each pair of cooperating anode and cathode is higher than that in other portions of the furnace, it is apparent that the mechanical forces induced in the molten metal in said three spaced by the mutual actions between the D.C. currents and the magnetic lines of force will be intensified and the stirring effects will be improved. In the case of the arrangement as shown in FIGS. 3 and 4, said mechanical forces acting on the molten metal are induced in the direction as shown by arrows according to the Fleming's left-hand rule, thereby the molten metal in the furnace is forced to circulate in the counter clockwise direction. If the polarity of the D.C. current fed to the electrodes 2' and 3' or the exciting current fed to the D.C. electromagnets 6 and 6' is reversed with a certain time interval, the molten metal in the furnace will be forced to make a reciprocating circular motion, and the stirring effects will be further improved.

FIG. 6 illustrates an example of circuit arrangement for the electric arc furnace equipped with a stirrer described in the foregoing referring to FIGS. 1 to 4, wherein 9 designates a rectifier to produce D.C. currents for melting metal in the furnace and the cathodes 3' are connected to a plate electrode 3 located at the furnace bottom. 10 is a change-over switch enabling the selection of A.C. or D.C. currents, thereby the melting operation can be carried out either by A.C. currents as in conventional devices or by D.C. currents as described in the foregoing, whilst the stirring operation of the invention is conducted by feeding D.C. currents in the molten metal, which requires the operation of said change-over switch if A.C. currents are used for melting metals. The exciting coil 5 of the electromagnet is fed by the rectifiers 11, but it is of course possible to feed said exciting coil 5 from said rectifiers 9 by connecting said coil 5 either in series or in parallel to the furnace instead of using a separate rectifier 11. The polarity of the exciting current in the coil 5 may be reversed by means of the change-over switch 12 in order to further active the stirring operation by reversing the direction of the circulation of said molten metal.

Figure 7:
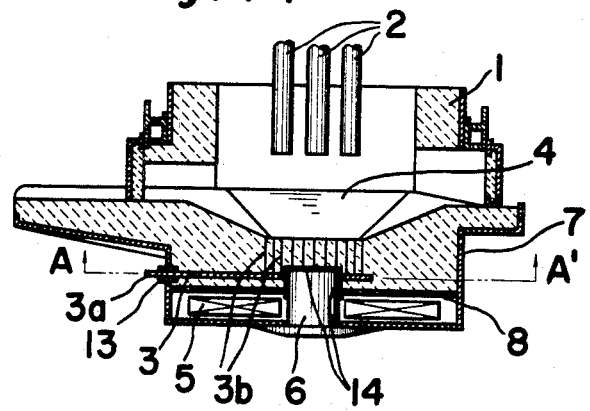
FIG. 7 is a vertical sectional view of the electric arc furnace embodying the invention.

FIGS. 7 and 8 are vertical sectional view and a horizontal sectional view on the line A–A' respectively illustrating the detailed construction of a practical electric arc furnace, wherein 1 designates the furnace wall, 2 anodes, 3a a plate electrode located at the furnace bottom and made of gun metal, 3b cathodes consisting of a number of mild steel bars fixed to the plate electrode 3a in three groups and embedded in the refractory material at bottom of the furnace so as to expose only top portions thereof into the bath 4. The reference numeral 5 represents exciting coil of the electromagnet, 6 a pole of the electromagnet, and 7 an outer casing of the furnace made of magnetic material such as an iron plate, which also serves as an outer magnetic pole of said electromagnet. The bottom plate 8 of the furnace is made of a non-magnetic metal. The magnetic pole 6 is electrically insulated from the plate electrode 3a located at the furnace bottom as well as from the bottom plate 8 of the furnace by means of insulating materials 14, and said plate electrode 3a located at the furnace bottom is electrically insulated from the outer casing 7 of the furnace by means of the insulating materials 13. The plate electrode 3a at the furnace bottom should be buried in the refractory material at sufficient distance from the bath for heat insulation and to prevent its melting without using additional water cooling devices, though it is preferable to water cool said plate electrode 3a, and also the magnetic pole 6.

A test was carried out to check the stirring effect of the device of the invention by melting carbon steel containing 0.6% of carbon by using a 50 kg. electric arc furnace of the type shown in FIG. 7 and adding 4% of tungsten into thus melted steel bath, thereafter the time taken to homogenize molten metal was measured. For the sake of the comparison, similar mixing was made and similar measurements were taken by using a conventional furnace having no stirrer. The results are shown in FIG. 9, wherein the curve A shows the results when using the stirrer of the invention for stirring said molten metal in the bath and the curve B shows the results when using a conventional furnace having no stirrer.

In said test, the tungsten was wrapped with aluminum foils and thrown into the central portion of the bath in the furnace after the temperature of the bath reached 1,600° C., and the test samples for chemical analysis were taken by suction from a certain predetermined point of the bath at uniform time intervals. The conditions for stirring the bath during said tests comprised of a D.C. melting current of 2,000 A., an exciting current of the electromagnet of 80 A. and a circulating speed of the slag surface of 40 to 50 cm./sec.

Figure 9:
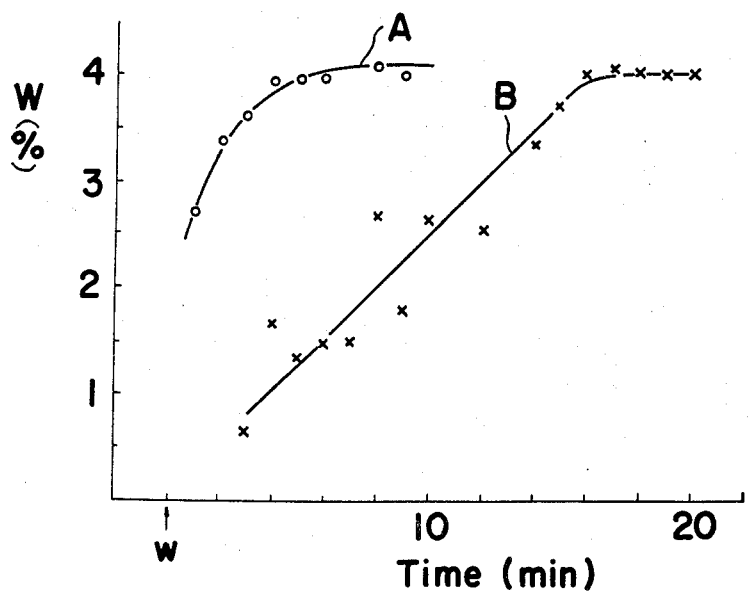
FIG. 9 is a curve diagram illustrating the stirring effects of the device of the invention compared with that of the conventional device.

It is apparent from FIG. 9 that the time necessary for attaining homogeneity of the bath in the furnace is shortened to a considerable extent if the stirring device of the invention is used.

In the foregoing, the method of stirring and the stirring device of the invention have been described referring only to electric arc furnaces, however, said method and device can be of course applied to the operation of stirring molten metal not only in other type melting furnaces using D.C. currents but also in vessels such as ladles.

What we claim is:

1. A device for stirring molten metal in an electric furnace comprising at least one first electrode within the furnace to be at the upper portion of molten metal in the furnace, at least one second electrode at the bottom of the furnace, said first and second electrodes being connectible respectively to D.C. electric power of opposite polarity and being positioned for feeding direct current between them through molten metal in furnace, at least one D.C. electromagnet at the central portion of the bottom of the furnace connectible to a source of D.C. electric power, and magnetic material at the side walls of the furnace constituting a magnetic pole cooperating with said electromagnet for producing radial magnetic lines of force through molten metal in the furnace between the electromagnet and the magnetic material at the side wall of the furnace when the electromagnet is energized, the first and second electrodes being located for currents passing through molten metal between them to intersect said radial magnetic lines of force, thereby to induce mechanical forces in the molten metal to stir it.

2. A device for stirring molten metal in an electric furnace according to claim 1, which comprises one of said first electrodes installed at the central portion within the furnace, a plurality of said second electrodes embedded in the inside bottom of the furnace on a circle having its center at the vertical projection of said first electrode on the surface of said inside bottom of the furnace, and one of said D.C. electromagnets mounted at the central portion of the furnace bottom so as to magnetize an iron core thereof and an outer casing made of magnetic material surrounding the furnace wall in opposite magnetic polarities when the D.C. electromagnet is energized.

3. A device for stirring molten metal in an electric furnace according to claim 1, wherein a plurality of said first electrodes are installed within the furnace and a plurality of said second electrodes are embedded in the inside bottom of the furnace in such a manner that locations of said second electrodes and the vertical projections of said first electrodes on the surface of the inside bottom of the furnace occupy alternately apices of a polygon.

4. A device of stirring molten metal in an electric furnace according to claim 1, wherein locations of a plurality of said second electrodes embedded in the inside bottom of the furnace and the vertical projections of a plurality of said first electrodes installed within the furnace on the surface of the inside bottom of the furnace are in the proximity of a circle having its center substantially coinciding with the center of the furnace.

5. A device for stirring molten metal in an electric furnace according to claim 1, wherein said D.C. electromagnets comprise a first D.C. electromagnet mounted at the central portion of the bottom of the furnace and which includes a plurality of second D.C. electromagnets secured to an outer casing of non-magnetic material surrounding the furnace wall and adapted to produce magnetic poles having a common magnetic polarity opposite to that of a magnetic pole at the bottom center of the furnace caused by said first D.C. electromagnet, each of said second D.C. electromagnets being located on a horizontal plane passing through about middle level of the molten metal in the furnace and at a point on each vertical radial plane radiating from the vertical axial center line of the furnace and including each of said first electrode respectively.

(References on following page)

References Cited

UNITED STATES PATENTS

| | | | |
|---|---|---|---|
| Re. 25,124 | 2/1962 | Garmy | 13—11 XR |
| 2,014,615 | 9/1935 | Ferguson | 13—6 |
| 2,363,582 | 11/1944 | Gerber et al. | |
| 2,789,152 | 4/1957 | Ham et al. | 13—9 XR |
| 3,180,916 | 4/1965 | Menegoz et al. | 13—9 |

BERNARD A. GILHEANY, *Primary Examiner.*

H. B. GILSON, *Assistant Examiner.*